| United States Patent [19] | [11] 3,932,358 |
|---|---|
| de Cleur et al. | [45] Jan. 13, 1976 |

[54] PULVERENT COATING MATERIALS CONTAINING POLYOXAZOLINES AND POLYESTERS BASED ON SUCCINIC ANHYDRIDE

[75] Inventors: Eckhard de Cleur, Duisburg; Rolf Dhein, Krefeld-Bockum; Hans Rudolph, Krefeld-Bockum; Hans Joachim Kreuder, Krefeld-Bockum, all of Germany

[73] Assignee: Bayer Aktiengesellschaft, Germany

[22] Filed: Nov. 4, 1974

[21] Appl. No.: 520,500

Related U.S. Application Data

[62] Division of Ser. No. 473,340, May 28, 1974.

[30] Foreign Application Priority Data
June 1, 1973   Germany............................ 2328012

[52] U.S. Cl................................ 260/75 N; 260/860
[51] Int. Cl.$^2$......................................... C08G 63/46
[58] Field of Search........................ 260/75 N, 860

[56] References Cited
UNITED STATES PATENTS

| 3,235,507 | 2/1966 | Pollock et al..................... 260/75 N |
| 3,438,943 | 4/1969 | Miranda et al. .................. 260/75 N |

*Primary Examiner*—Donald E. Czaja
*Assistant Examiner*—S. M. Person
*Attorney, Agent, or Firm*—Connolly and Hutz

[57] ABSTRACT

The invention relates to a pulverulent coating material prepared from a polyester which contains free carboxyl groups of succinic acid and cross-linking agents which react with carboxyl groups at elevated temperatures.

8 Claims, No Drawings

PULVERENT COATING MATERIALS CONTAINING POLYOXAZOLINES AND POLYESTERS BASED ON SUCCINIC ANHYDRIDE

CROSS-REFERENCE TO RELATED APPLICATION

This application is a division of application Ser. No. 473,340 filed May 28, 1974.

This invention relates to a pulverulent coating material prepared from a polyester which contains free carboxyl groups of succinic acid and cross-linking agents which react with carboxyl groups at elevated temperatures.

Linear polyesters which are prepared from dicarboxylic acids and excess quantities of diols are disclosed as powder lacquer binders in German OS No. 1,905,825. These products can be cross-linked by way of their free hydroxyl groups with mixtures of triglycidyl isocyanurate and polycarboxylic acid anhydride. The polyesters are, however, so chosen that their relative viscosities are between 1.51 and 1.55, and they must therefore be ground up under conditions of cooling with carbon dioxide. The products melt at temperatures above 180°C and are stoved at above 270°C.

Furthermore, in German OS No. 2,015,563 it has been disclosed to combine a weakly branched polyester which contains free carboxyl groups and which are based on succinic acid and butane-1,4-diol with diepoxide compounds, and to obtain elastomeric, rubbery elastic shaped products by heat treating these masses. It is said that an interesting possible means of application of these products is, as powders applied by whirl sintering.

Since the polyesters described in that specification must be crystalline, the products are required to be very pure. Furthermore, these systems consist of more than 90 mols % of a structural element formed from succinic acid and butane-1,4-diol, and consequently the lacquers obtained are rubber-like rather than hard.

Solid acid polyester resins which are cross-linked with polyepoxide resins have been described in German OS No. 2,163,962. The acid polyester resins are reaction products of an anhydride of a carboxylic acid which is at least tribasic, e.g. trimellitic acid, or mixtures thereof with up to 50 mols percent of dicarboxylic acid anhydrides and a polyester resin which has an OH-number of 15 – 50 and a softening point of 60°–130°C. The epoxide resin used for cross-linking is preferably triglycidyl isocyanurate. Although hard lacquer coats can be obtained from these products, the elasticity values of the lacquer films are only 1– 6 mm (according to DIN 53,156). Moreover, acid polyesters prepared by using trimellitic acid anhydride cannot be worked up with bisoxazolines in the usual mixing apparatus such as extruders to produce a suitable powder lacquer because cross-linking occurs under the operating conditions.

It is known from German OS No. 2,012,809 that cross-linked reaction products can be obtained by heating polyoxazolines and substances which contain carboxylic acid groups. The product described as the solid polyester which contains carboxylic acid groups and which can be pulverised after homogenisation with a bisoxazoline is the reaction product of a hydroxyl-containing polyester and phthalic acid anhydride. The homogenized mixture of the polyester and bisoxazoline can be cross-linked by heating to 170°C. Acid polyesters in which the carboxyl end groups are derived exclusively from the phthalic acid group are, however, unuseable as powder lacquer binders because the lacquer films obtained after 30 minutes' stoving at 170°C are inelastic.

It has now surprisingly been found that the disadvantages described above can be obviated and in addition heat hardenable pulverulent coatings can be obtained with improved properties if the polyesters with free carboxyl groups which are used are of the kind which are obtained by reacting a polyester which contains a hydroxyl group with a specially selected dicarboxylic acid anhydride, preferably succinic acid anhydride. Acid polyesters obtained in this way which contain free carboxyl groups of succinic acid as the end or side groups can be combined both with polyepoxide compounds and with polyoxazolines, or with mixtures of these classes of substances, to form powder lacquers which give rise to lacquer films having excellent properties. One finding which was particularly unforeseeable was that polyesters which contain free carboxyl groups of succinic acid react smoothly with polyoxazolines to highly cross-linked laquer films when stoved and thus give rise to lacquer films with excellent properties. This was particularly surprising since it was known from the literature (Journal Polymer Sc., Volume 4, pages 257–260 (1966) that the yield of polyester amides which can be obtained by reacting adipic acid and bisoxazolines in the presence of dimethylformamide for 10 hours at 120°C is only from 24 to 61 %. The improved elasticity obtained when such modified polyesters were cross-linked with polyepoxide was equally unexpected.

This invention relates to a powder lacquer binder obtained from a mixture of polyepoxide resin and/or polyoxazoline and polyester resin which contain free carboxyl groups and have acid numbers of from 30 to 85 and softening points above 40°C, characterised in that the mixtures consist of A) polyepoxides and/or polyoxazolines and B) polyester resins which contain free carboxyl groups and which are reaction products of a. succinic acid anhydride, optionally mixed with other dicarboxylic acid anhydrides, and b. polyester resins which have an OH number of about 40–100 and which are prepared from polyalcohols and aromatic dicarboxylic acids which may be replaced to an extent of up to 30 mols % by cycloaliphatic and/or aliphatic dicarboxylic acids.

When the acid polyester resins according to the present invention are combined with polyepoxide and/or polyoxazolines which are used as cross-linking agents, the mixtures according to the invention are distinguished from those previously mentioned by the fact that they readily homogenize in the melt in a suitable mixing apparatus at temperatures of about 80° to about 120°C and can then be ground to the required particle size without prior cooling, and further can be hardened at a temperature of between 130°C and 220°C and stoved to form a hard, elastic, smooth lacquer.

The acid polyesters according to the invention are prepared by reacting polyesters containing hydroxyl groups with succinic acid anhydride optionally in admixture with other dicarboxylic acid anhydrides. The following are examples of the dicarboxylic acid anhydrides which may be used in combination with succinic acid anhydride: Maleic acid anhydride, hexahydrophthalic acid anhydride, tetrahydrophthalic acid anhydride, endomethylene tetrahydrophthalic acid anhydride, endoethylene tetrahydrophthalic acid anhydride and methyl tetrahydrophthalic acid anhydride. The succinic acid anhydride is preferably used in the form of a mixture with maleic acid anhydride and/or hexahydrophthalic acid anhydride and/or tetrahydrophthalic acid anhydride. A limited proportion of PSA may also be included.

The hydroxyl polyesters which are used as the starting material are obtained by known methods, preferably from aromatic polycarboxylic acids such as phthalic acid, isophthalic acid, terephthalic acid, 3,6-dichlorophthalic acid, tetrachlorophthalic acid or, where available, their anhydride, and diols such as ethylene glycol, propane-1,2-diol, propane-1,3-diol, butane-1,2-diol, butane-1,4-diol, dimethylpropane-2,2-diol, hexane-2,5-diol, hexane-1,6-diol, 4,4'-dihydroxy-dicyclohexyl-propane-2,2,-cyclohexanediol, dimethylolcyclohexane, diethyleneglycol and 2,2-bis-[4-($\beta$-hydroxyethoxy)-phenyl]-propane and polyols such as glycerol, hexanetriol, pentaerythritol, sorbitol, trimethylolethane, trimethylolpropane and tris-($\beta$-hydroxyethyl)-isocyanurate.

Cycloaliphatic and/or acyclic polycarboxylic acids may be used additionally in a quantity of up to 30 mols percent of all the polycarboxylic acids. The following are examples: Tetrahydrophthalic acid, hexahydrophthalic acid, endomethylenetetrahydrophthalic acid, adipic acid, succinic acid and maleic acid. Minor quantities of monocarboxylic acids such as benzoic acid, tert.-butylbenzoic acid, hexahydrobenzoic acid and saturated aliphatic monocarboxylic acids may also be included.

The polyesters are prepared in known manner by esterification at a temperature of approximately 170°–260°C, optionally in the presence of the usual catalysts such as germanium dioxide or di-n-butyl tin oxide. The OH/COOH ratios are suitable chosen so that the end products have a hydroxyl number of between about 40 and about 100 and preferably between about 55 and 70.

The polyester which are used are preferable those which can be obtained from terephthalic acid, isophthalic acid, ethylene glycol, neopentyl glycol, hexane-1,6-diol, glycerol, trimethylolethane, trimethylolpropane or pentaerythritol. Polyesters obtained from terephthalic acid, neopentyl glycol and/or hexane-1,6-diol and trimethylolpropane are particularly preferred. The OH/COOH ratio should be between 1.06 and 1.35 and preferably between 1.1 and 1.25. The ratio of polyalcohols to dicarboxylic acids is advantageously between 1.05 and 1.25 and preferably from 1.07 to 1.18.

These hydroxy-containing polyesters are preferably reacted with a stoichiometric quantity of succinic acid anhydride, optionally admixed with other dicarboxylic acid anhydrides, at temperatures of about 160°–210°C in known manner in order to produce the acid polyester resins according to the invention which have an acid number of between 30 and 85 and preferably between 40 and 60.

If the succinic acid anhydride is used as a mixture with other dicarboxylic acid anhydrides, the quantity of succinic acid anhydride in the mixture should preferably be above 50 mols percent, based on the total quantity of dicarboxylic acid anhydrides used.

Polyepoxide resins which contain an average of at least two epoxide groups per molecule and/or polyoxazolines are particularly suitable for cross-linking the COOH-containing polyesters according to the invention for use as a powder lacquer binder.

The following are examples of suitable polyepoxide resins: Triglycidyl isocyanurate; solid polyepoxide having molecular weights of up to 2000, such as those which can be obtained from bisphenol A and epichlorhydrin; bis-glycidyl esters of terephthalic acid, isophthalic acid, phthalic acid, tetrahydrophthalic acid, hexahydrophthalic acid or hexahydroterephthalic acid; trisglycidyl esters of trimellitic acid; tetraglycidyl esters of pyromellitic acid; the corresponding $\beta$-methylglycidyl esters are also suitable; glycidyl derivatives of hydantoin according to the following formula

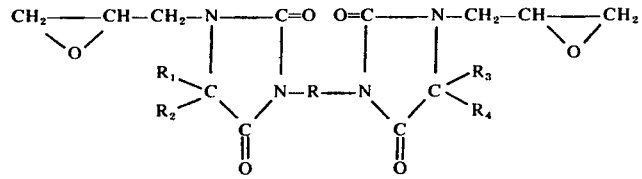

Wherein R denotes an aliphatic ($C_1$–$C_4$), cycloaliphatic or araliphatic group and $R_1$, $R_2$, $R_3$ and $R_4$ each denote a hydrogen atom or an aliphatic ($C_1$–$C_4$) or cycloaliphatic hydrocarbon group or $R_1$ and $R_2$ together or $R_3$ and $R_4$ together may form a divalent aliphatic or cycloaliphatic hydrocarbon group, preferably a tetramethylene or pentamethylene group. $R_1$, $R_2$, $R_3$ and $R_4$ in the general formula preferably denote hydrogen or a lower alkyl group containing 1 to 4 C atoms.

Bis-glycidyl esters of terephthalic acid, triglycidyl isocyanurate and bis-glycidyl derivatives of hydantoin are of particular interest.

The following are examples of suitable polyoxazolines: 1,2-, 1,3- and 1,4-Bis-($\Delta$2-oxazolinyl-2)-benzene; 1,2-, 1,3-, 1,4-bis-($\Delta$2-4-methyl-oxazolinyl-2)-benzene; 1,2-, 1,3-, 1,4- bis-($\Delta$2-5-methyl-oxazolinyl-2)-benzene; 1,2-, 1,3-, 1,4-bis-($\Delta$2–5-ethyloxazolinyl-2)-benzene; 1,2,4-tris-($\Delta$2-oxzaolinyl-2)-benzene: 1,2-bis-($\Delta$2-oxazolinyl-2)-ethane; 1,4-bis-($\Delta$2-oxazolinyl-2)-butane; 1,4-bis-($\Delta$2-5-methyl-oxazolinyl-2)- butane. The following are particularly suitable: 1,3- and 1,4-bis-($\Delta$2-oxazolinyl-2)-benzene.

The quantity of cross-linking agent used is preferably chosen so that about one epoxide group or oxazoline group is used for each free carboxyl group of the polyester. Slight overcross-linking or undercross-linking is also possible if so desired.

The softening points of the mixtures of polyesters which contain free carboxyl groups and polyglycidyl esters and/or polyoxazolines are such that the mixtures can be worked up with the necessary additives for producing the coating substances according to the invention at temperatures of between 80° and 120°C. On the other hand, the softening points of the mixtures should be such that the coatings according to the invention will now clump together but can be ground up into free flowing powders with a particle size of about 20 to about 120 $\mu$.

In practice, this means that the polyesters which contain free carboxyl groups should have a softening point of between 40° and 120°C, as determined by differential thermoanalysis.

The coating substances according to the invention may be prepared in a suitable mixing apparatus such as a stirrer vessel or mixing screw (extruder). The usual additives such as pigments, levelling agents, fillers and catalysts such as tertiary amines and their salts such as benzyl dimethylamine, metal salts of organic acids such as tine octoate or bismuth salicylate or also imidazoles may be added.

SZ: 10
OHZ: 50
E.P.: approx. 70°C (DTA) *)
Viscosity: 155 seconds (50 parts by weight polyester in 50 parts by weight xylene/ n-butanol 9:1 according to DIN 53 211).

30.00 Parts of the above mentioned polyester resin are reacted, in each case, with various carboxylic acid anhydrides for 1 hour at the temperatures indicated in Table 1 to produce polyester resins which contain free carboxyl groups.

Table 1

| Example 1 | | Comparison experiments | | | | |
|---|---|---|---|---|---|---|
| | | 1 | 2 | 3 | 4 | 5 |
| Quantity of carboxylic acid anhydride | 2.67 parts succinic acid anhydride | 4.12 parts hexahydrophthalic acid anhydride | 2.62 parts maleic acid anhydride | 4.07 parts tetrahydrophthalic acid anhydride | 3.96 parts phthalic acid anhydride | 5.12 parts trimellitic acid anhydride |
| Temperature | 160°C | 160°C | 160°C | 160°C | 160°C | 180–200°C |
| SZ | 63 | 57 | 58 | 54 | 58 | 83 |
| E.P. (DTA)* | 59–60°C | 72–75°C | 56–59°C | 69–72°C | 61–63°C | 87–89°C |
| Viscosity (40% in cyclohexanone according to DIN 53 211) | 156 sec | 132 sec | 154 sec | 144 sec | 136 sec | 292 sec |

*SZ = acid number;
E.P. = softening point
DTA = differential thermal analysis, see R. C. Mackenzie, London, (1970), Vol. 1.
OHZ = hydroxyl number The products according to the invention are applied to supports by the usual methods, in particular by the electrostatic powder spraying process (EPS process).

When heated to temperatures above 130°C and preferably from 150° to 220°C, the lacquer films rapidly harden to form hard and smooth coatings.

The following examples illustrate the subject matter of the invention but are not intended to restrict it. In the Examples 'parts' represents parts by weight.

EXAMPLE 1 and Comparison experiments 1 – 5

A polyester resin with the following properties is prepared by a conventional process from 68.43 parts of bisoxethylbisphenol A, 4.17 parts of glycerol and 38.83 parts of terephthalic acid:

The quantities of acid polyester resin of Example 1 and comparison experiments 1–5 indicated in Table 2, are size reduced and intimately mixed with the appropriate proportions of 1,4-bis-(Δ2-oxazolinyl-2)-benzene, rutiletitanium dioxide pigment and acrylate based levelling agent (Acronal $^R$ 4 F, product of BASF) in a pan mixer and then extruded at 110°–120°C. When the resulting strand is cold, it is ground in a pin mill to a particle size of less than 90μ and it is then applied to cleaned metal sheets by means of an electrostatic powder spray installation operating at 60 KV. After stoving (30 minutes at 180°C), the lacquer coats described in Table 2 are obtained.

Table 2

| Example 1 | | | Comparison experiments | | | | |
|---|---|---|---|---|---|---|---|
| | | | 1 | 2 | 3 | 4 | 5 |
| Quantity | resin | 90.5 parts | 90.5 parts | 90.5 parts | 90.5 parts | 90.5 parts | 86.0 parts |
| " | bisoxazoline | 9.5 | 9.5 | 9.5 | 9.5 | 9.5 | 14.0 |
| " | TiO₂ | 67.0 | 67.0 | 67.0 | 67.0 | 67.0 | 67.0 |
| | levelling agent | 1.0 | 1.0 | 1.0 | 1.0 | 1.0 | 1.0 |
| Appearance of lacquer coats: | | smooth | smooth | smooth | smooth | smooth | cannot be produced |
| Elasticity according to Erichsen:(DIN 53 156) | | 10mm | <1mm | <1mm | <1mm | <1mm | |

It is seen from the comparison of the lacquer coats that only the acid polyester resin which contains carboxyl groups of succinic acid in accordance with the invention (Example 1) gives an elastic lacquer coat.

Lacquer coats cannot be obtained at all from the polyester resin prepared in comparison experiment 5 because cross-linking has already occurred at the stage of homogenization of the mixture in the extruder.

EXAMPLE 2

217 Parts of trimethylolpropane, 1484 parts of neopentyl glycol, 212 parts of hexane-1,6-diol, 2647 parts of terephthalic acid and 1.99 parts of di-n-butyl tin oxide are melted in a 5 l vessel under a stream of nitrogen. The contents are heated to 170°–220°C with stirring, the water of reaction and a small quantity of neopentyl glycol distilling off. When the reaction mixture reaches an acid number of about 10 to 12, a softening point of 58°–61°C, a viscosity of 155 seconds 40 parts by weight resin in 60 parts by weight cyclohexanone according to DIN 53 211) and an OH number of 58 to 60, it is cooled to 160°C. 353 parts of succinic acid anhydride are added and stirring is continued for one hour until the acid number is 54. The resin melt is then discharged.

| Characteristics: | Acid number | 54 |
|---|---|---|
| | Viscosity: | 185 seconds (40 parts by weight resin in 60 parts by weight cyclohexanone according to DIN 53 211) |
| | Softening point:(DTA) | 46–47°C |

According to Table 3, 100 parts of acid polyester resin, 73.5 parts of rutile titanium dioxide pigment and 1.1 part of a levelling agent are worked up, in each case with the corresponding quantity of a cross-linking agent to produce a powder lacquer as described in Example 1, and then applied to cleaned metal sheets by electrostatic spraying. Hard, elastic, glossy lacquer coats are obtained after stoving (30 minutes at 160°C).

Table 3

| Quantity of cross-linking agent | 2a | 2b | 2c | 2d |
|---|---|---|---|---|
| Triglycidyl isocyanurate | — | 1.8 parts | 4.5 parts | 9.0 parts |
| 1,4-bis-(Δ2-oxazolinyl-2)-benzene | 10.0 parts | 8.0 parts | 5.0 parts | — |
| Lacquer coats: | | | | |
| Elasticity according to Erichsen (DIN 53 156) | 10 mm | 10 mm | 10 mm | 10 mm |
| Gloss 60 degrees C (according to Gardner) (ASTM-D-523) | 83 | 83 | 83 | 86 |

EXAMPLE 3

181 Parts of trimethylolpropane, 1464 parts of neopentyl glycol, 212 parts of hexane-1,6-diol, 2689 parts of terephthalic acid and 2 parts of di-n-butyl tin oxide are condensed at 180 to 220°C as described in Example 2, until the reaction mixture reaches an acid number of 10, softening point of 60°–62°C and viscosity of 110 seconds (20 parts by weight resin in 80 parts by weight m-cresol according to DIN 53 211) and an OH number of 52 – 55. The reaction mixture is then cooled to 160°C, and 159 parts of succinic acid anhydride and 242 parts of tetrahydrophthalic acid anhydride are added. The reaction mixture is discharged after a reaction time of 1 hour.

| Characteristics: | Acid number: | 53 |
|---|---|---|
| | Viscosity: | 182 seconds (40 parts by weight in 60 parts by weight cyclohexanone according to DIN 53 211) |
| | Softening point: (DTA): | 54–58°C. |

100 Parts of resin, 9 parts of triglycidyl isocyanurate, 73.5 parts of rutile titanium dioxide pigment and 1.1 part of a levelling agent are worked up into a powder lacquer as described in Example 1 and when this lacquer is applied electrostatically to degreased metal sheets and stoved for 30 minutes at 160°C, elastic and glossy lacquer coats are obtained.

| Erichsen cupping (DIN 53 156): | 10 mm |
|---|---|
| Gloss 60 degrees (according to Gardner): | 85 |

We claim:

1. In a powder lacquer binder consisting of a mixture of
  A. at least one polyoxazoline and
  B. at least one polyester resin which contains free carboxyl groups and has an acid number of 30 to 85 and a softening point above 40°C., the improvement wherein said polyester resin is the condensation product of
    a. at least one dicarboxylic acid anhydride wherein at least 50 mol % thereof is succinic acid anhydride and
    b. at least one polyester resin having an OH number of about 40 to 100, said polyester resin being the condensation product of at least one polyalcohol and at least one aromatic dicarboxylic acid or said condensation product having up to 30 mol % of said aromatic dicarboxylic acid replaced with at least one cycloaliphatic dicarboxylic acid, at least one aliphatic dicarboxylic acid or a mixture thereof, the quantity of polyoxazoline present being sufficient to provide about one oxazoline group for each free carboxyl group of the polyester.

2. The powder lacquer binder of claim 1 wherein the polyoxazoline is 1,3-(Δ2-oxazolinyl-2)-benzene, 1,4-(Δ2-oxazolinyl-2)-benzene or a mixture thereof.

3. The powder lacquer binder of claim 1 wherein said polyester resin having an OH number of about 40 to 100 is the condensation product of ethylene glycol, neopentyl glycol, hexane-1,6-diol, glycerol, trimethylolethane, trimethylopropane, pentaerythritol or a mixture of two or more of said polyols and terephthalic acid, isophthalic acid or a mixture of said acids.

4. The powder lacquer binder of claim 1 wherein said polyester resin having an OH number of about 40 to 100 is the condensation product of trimethylolpropane and either neopentyl glycol or hexane-1,6-diol or a mixture of neopentyl glycol and hexane-1,6-diol with terephthalic acid.

5. The powder lacquer binder of claim 1 wherein the ratio of polyalcohol to dicarboxylic acid in said polyester resin having an OH number of about 40 to 100 is between 1.05 and 1.25 and the hydroxyl to carboxy ratio is between about 1.06 and 1.35.

6. The powder lacquer binder of claim 1 wherein the ratio of polyalcohol to dicarboxylic acid in said polyester resin having an OH number of about 40 to 100 is from 1.07 to 1.18:1 and the hydroxyl to carboxy ratio is from 1.1 to 1.25:1.

7. The powder lacquer binder of claim 1 wherein the polyester resin of component (b) has an OH number of 55 to 70.

8. The powder lacquer binder of claim 1 wherein component (a) is succinic acid anhydride in admixture with at least one member selected from the group consisting of maleic acid anhydride, hexahydrophthalic acid anhydride and tetrahydrophthalic acid anhydride.

* * * * *